United States Patent
Tateson

(10) Patent No.: US 6,539,228 B1
(45) Date of Patent: Mar. 25, 2003

(54) CHANNEL ALLOCATION IN CELLULAR TELEPHONY

(75) Inventor: Richard E Tateson, Wickham Market (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/647,737

(22) PCT Filed: Apr. 15, 1999

(86) PCT No.: PCT/GB99/01150

§ 371 (c)(1),
(2), (4) Date: Oct. 4, 2000

(87) PCT Pub. No.: WO99/56488

PCT Pub. Date: Nov. 4, 1999

(30) Foreign Application Priority Data

Apr. 24, 1998 (GB) .............................................. 9808841
Apr. 24, 1998 (EP) .............................................. 98303211

(51) Int. Cl.[7] .................................................. H04Q 7/20
(52) U.S. Cl. ........................ 455/446; 455/450; 455/452; 455/424; 455/423
(58) Field of Search ................................ 455/450, 452, 455/63, 423, 424, 512, 513, 514, 446

(56) References Cited

U.S. PATENT DOCUMENTS

| | | | | |
|---|---|---|---|---|
| 5,448,750 A | * | 9/1995 | Eriksson | 455/452 |
| 5,561,841 A | * | 10/1996 | Markus | 455/422 |
| 5,657,343 A | * | 8/1997 | Schilling | 375/133 |
| 5,710,758 A | * | 1/1998 | Soliman et al. | 370/241 |
| 5,809,423 A | * | 9/1998 | Benveniste | 455/452 |
| 5,903,848 A | * | 5/1999 | Takahashi | 455/450 |
| 6,094,584 A | * | 7/2000 | Khanna et al. | 455/452 |
| 6,112,092 A | * | 8/2000 | Benveniste | 455/450 |
| 6,128,498 A | * | 10/2000 | Benveniste | 455/450 |
| 6,128,500 A | * | 10/2000 | Raghavan et al. | 455/453 |
| 6,178,329 B1 | * | 1/2001 | Chao | 455/452 |
| 6,246,881 B1 | * | 6/2001 | Parantainen | 455/450 |
| 6,301,478 B1 | * | 10/2001 | Wallstedt et al. | 455/436 |
| 6,408,185 B1 | * | 6/2002 | Freeman et al. | 455/446 |

* cited by examiner

Primary Examiner—William Trost
Assistant Examiner—Marcos Torres
(74) Attorney, Agent, or Firm—Nixon & Vanderhye P.C.

(57) ABSTRACT

A channel allocation process for a cellular telephone network starts from a position of homogeneity in which each base station has the potential to use all channels. It develops ever greater heterogeneities by processing a combination of short and medium range interactions between the base stations themselves, causing each base station of the cellular telephone network to inhibit its neighbors from using a given channel, to generate a usage factor for each channel in each cell indicative of the level of interference to be expected on that channel in that cell. Channels can then be allocated to each base station according to the ranking of the usage factors determined for the channels at that base station. The entire network may be emulated by a single processor, controlling the base stations of the network in accordance with the results of the process. Alternatively, each base station of the network performs that part of the process relating to itself, in co-operation with its neighbors, and utilizes channels in accordance with results.

10 Claims, 4 Drawing Sheets

CHANNEL ALLOCATION IN CELLULAR TELEPHONY

BACKGROUND OF THE INVENTION

1. Field of the Invention

This invention relates to channel allocation in cellular telephony, and in particular to a method for dynamically allocating channels to cells according to demand.

2. Related Art

A cellular telephone network consists of a number of fixed base station transceivers and a much larger number of mobile handsets which communicate with base stations via a radio channel. The number of radio channels which the operator is permitted to use is limited, and there are not enough for each phone call in the network to be carried on a different channel. Thus a central principle of such networks is channel reuse (Lee, W. C. Y.: *Mobile Cellular Telecommunications Systems*. McGraw-Hill Book Company, New York, 1989): at any time many base stations may be transceiving on each channel. This introduces the possibility of interference between phone calls. Interference from other calls using the same channel is known as 'co-channel interference'. 'Adjacent channel' interference, due to another call using a different channel, is also a problem: a call made on a channel corresponding to a frequency band of 4000–4025 kHz is liable to interference from a call on the adjacent band; 4025–4050 kHz. Adjacent channel interference can occur between two calls in the same cell, as well as between adjacent cells.

The 'cells' from which these cellular telephone networks get their name are the coverage areas of the individual fixed radio base stations (FIG. 2). The problem facing the network operator is to allocate channels to base stations such that demand for channels across the network is met, while keeping interference within acceptable levels. These aims are clearly in conflict: the more channels allocated to each base station the harder it is to plan the channel reuse to avoid unacceptable interference.

An added difficulty is that the demand across the network is neither uniform nor static. Some cells will experience high demand at particular times of the day but lower than average demand for the rest of the day, for example cells containing major arteries of commuter traffic. Even worse, for efficient channel allocation, are the unpredictable fluctuations in demand resulting from events such as road accidents.

It is currently common practice for operators to use a fixed channel allocation plan. The channels used by any particular base station are determined by a "frequency plan". This plan is only modified every few months if necessary to meet quality of service criteria, for example to meet changes in demand, and to allow for the installation of new base stations. During the existence of one frequency plan, each base station has its own allocation of channels, which remains the same throughout the life of the plan.

New base station technology, allowing speedy changes in channel use by base stations, is making the idea of dynamic channel allocation planning more attractive (Akaiwa, Y. and Andoh, H.: *Channel Segregation-A Self-Organized Dynamic Channel Allocation Method: Application To TDMA/FDMA Microcellular System*. IEEE Journal On Selected Areas In Communications 11 (6) (1993) 949–954).

Dynamic planning takes two forms: 'offline' in which channel use is planned to vary through the day according to the expected fluctuations in demand, and 'online' in which the channel use is reallocated in response to changes in demand as they happen. Dynamic planning can allow quality of service to be maintained as demand rises without the need for costly base station construction (Delli Priscoli, F., Magnani, N. P., Palestini, V. and Sestini, F.: *Application Of Dynamic Channel Allocation To The GSM Cellular Network*. IEEE Journal On Selected Areas In Communications 15 (8) (1997) 1558–1566). 'Online' dynamic planning is particularly attractive because it allows the network to deal with the unexpected as it happens, where an offline plan may fail. However, online planning requires operation in real time, and is thus more demanding of processing power.

Producing an efficient channel allocation plan is not only an important part of running an efficient mobile network, it is a formidable abstract mathematical problem. If there are k available channels the number of different ways of allocating l channels to a cell is:

$$\left(\frac{k!}{((k-l)!)(l!)}\right).$$

For a network of j cells with l available channels there are therefore $$\left(\frac{k!}{((k-l)!)(l!)}\right)^j$$

ways of allocating l channels to each cell. For example in the network of FIG. 2A, with fifty-eight cells, there are $(29!/(25! \, 4!))^{58} = (23751)^{58} = 6 \times 10^{253}$ different ways of assigning, to each cell, four of the twenty-nine available channels. Clearly an exhaustive search of solution space is not an appropriate method for optimising such a problem. Various processes have been applied to this problem including:

'subspace approach' (Lochtie, G. D. and Mehler, M. J.: *Subspace Approach To Channel Assignment In Mobile Communications*. IEE Proceedings Communications 142 (3) (1995) 179–185), "simulated annealing" (Aarts, E. and Korst, J.: *Simulated Annealing and Boltzmann Machines*. Wiley (1989) and "neural networks" (Kunz, D.: *Channel Assignment For Cellular Radio Using Neural Networks*. IEEE Transactions on Vehicular Technology 40 (1) (1991) 188–193).

Lochtie, G. D., van Eiji, C. A. and Mehler, M. J. compare various methods in *Comparison Of Energy Minimising Processs For Channel Assignment In Mobile Radio Networks*: Proceedings of the 8th IEEE International Symposium on Personal Indoor and Mobile Radio Communications (PIMRC'97) 3 (1997) 786–790)).

SUMMARY OF THE INVENTION

According to the present invention a channel allocation process is provided in which the process starts from a position of homogeneity in which all cells have the potential to use all channels, and develops ever greater heterogeneities which move it towards a solution by processing a combination of short and medium range interactions among the cells themselves, causing each cell (i.e. each base station) of the cellular telephone network to inhibit its neighbours from using a given channel, to generate a usage factor for each channel in each cell indicative of the level of interference to be expected on that channel in that cell. This process may be carried out by a single processor emulating the network, which can, if the system is to be carried out in real time (dynamically), then transmit the results of the process to each base station, or it can be carried out by the individual base stations, each interacting with its neighbours.

The process arrives at progressively better solutions by a process of mutual inhibition between cells. No global information is available to these cells and each must act on the basis of the inhibition it perceives from its neighbours. The process does not search solution space but instead moves through shades of grey towards a black and white solution (FIG. 2).

Further aspects of the invention relate to a cellular telephone system having means for performing this process, and to a computer program product directly loadable into the internal memory of a digital computer, said program product comprising software code portions for performing the process when said product is run on a computer, either to control a real network or as a planning tool.

The invention also extends to a computer-usable carrier carrying computer-readable program means for performing the various steps of the process. The computer-readable program means may be embodied on any suitable carrier readable by a suitable computer input device, such as CD-ROM, optically readable marks, magnetic media, punched card, or on an electromagnetic or optical signal.

BRIEF DESCRIPTION OF THE DRAWINGS

An exemplary embodiment of the invention will now be described with reference to the drawings, in which.

DETAILED DESCRIPTION OF EXEMPLARY EMBODIMENTS

Figure 1:
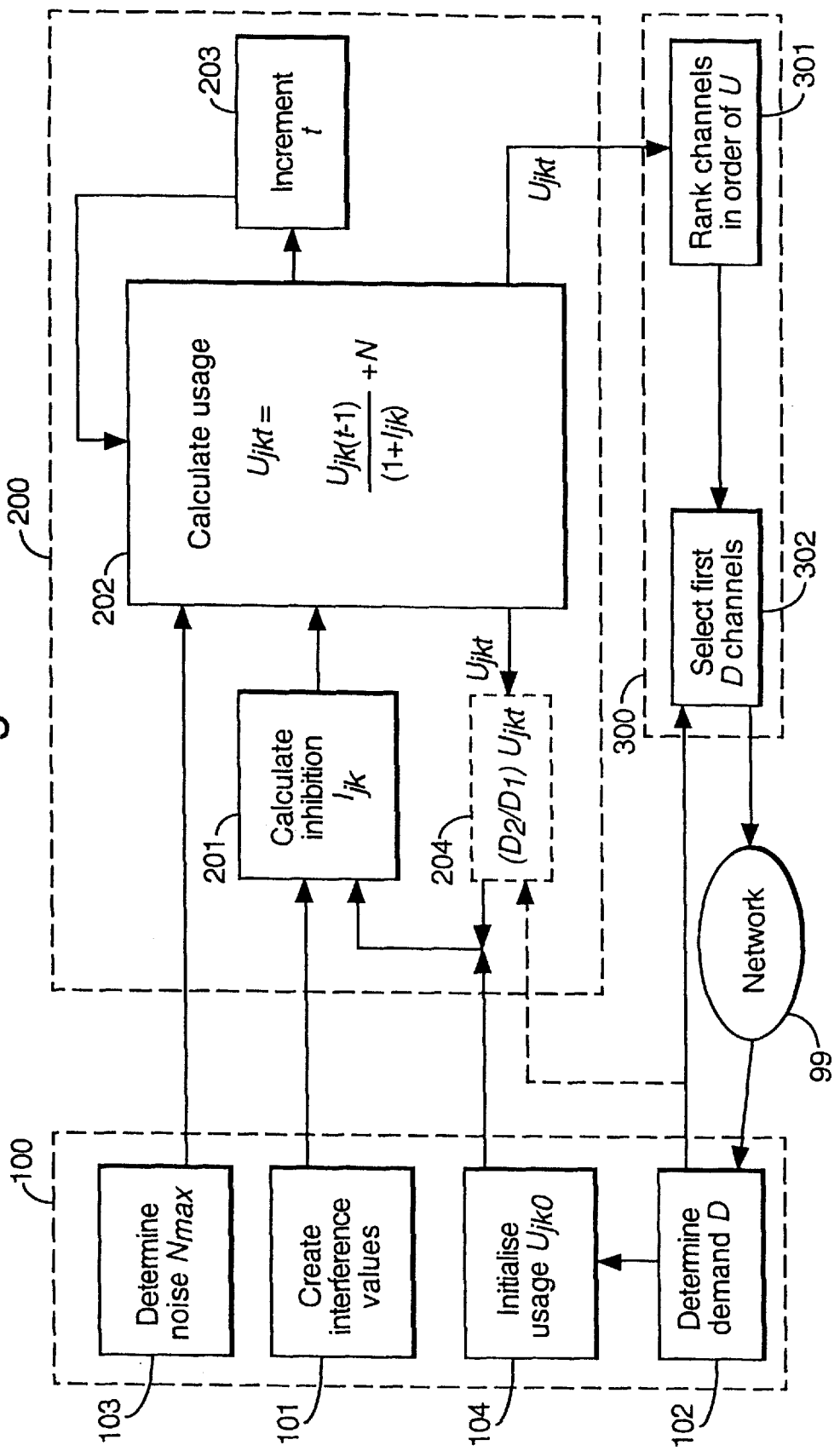
FIG. 1 is a schematic diagram of the various functional elements of the process

FIG. 1 is a schematic diagram illustrating the various functional elements of the process. These may be embodied as software on a general purpose computer. The process of producing a channel allocation plan begins with an initialisation phase of assembling the necessary information (phase 100). This is followed by an iterative progression from homogeneity towards a solution (phase 200). A solution can be extracted (phase 300) at any time but the quality of that solution improves as time goes on.

In the initialisation phase (100) an interference table is first provided (step 101). This is a j×j table (where j is the number of cells) which gives a value to the strength with which each cell can cause interference in each other cell. Separate tables may be used for co-channel interference and adjacent channel interference, but in both cases the full j×j table is used. Thus if better data is available concerning the interference values between two cells it can be incorporated into the relevant table without changing the number of computations per iteration.

The next step (102) is to obtain the demand for channels (i.e. the maximum number of simultaneous phone calls) which is to be met in each cell. This information can be obtained from the network 99, or from a theoretical or historical analysis, and can be changed as the process runs, allowing new solutions to be produced in response to unforeseen changes in demand.

A maximum value $N_{max}$ for the noise parameter N is also needed (step 103). This determines the size of the uniform random distribution from which the initial differences between cells and the perturbations, to which cells are subjected in every iteration, are taken. For the simulations used in the following examples, $N_{max}$ is 1% of the initial usage values unless otherwise stated.

Lastly the 'initial usage' of each channel in each cell must be determined (step 104). The idea of 'usage' in this context is important and needs some explanation. Each cell is imagined, for the purposes of the process, to be partially using all channels. In any one cell the sum of all the partial usages is set equal to demand D in that cell. At the start of the simulation all cells have almost equal 'usage' of all channels but as time goes on cells 'use' some channels more than others, depending on the inhibition they experience from their neighbours, and from adjacent channels in the same cell. This idea of partial usage is purely a mechanism by which the process moves towards a solution—it would never itself be a valid solution to the channel allocation problem. The job of producing a valid solution from the current usage values falls to the 'solution extractor' (phase 300) to be discussed later.

The iterative phase (200) involves calculating the new 'usage' of each channel in each cell based on the current 'usage', and on the inhibition perceived by that cell on the channel in question. FIG. 1 illustrates this process for one channel in respect of one cell—in each iteration the process takes place in respect of all channels in all cells.

Inhibition $I_{jk}$ is the sum of all the usages of channel k by all cells other than cell j, and of adjacent channels by all cells (including cell j), multiplied by the appropriate interference table value between cell j and the other cell (step 201). (For adjacent channel interference, the interference factor is lower than for co-channel interference). The new usage value can then be calculated (step 202) using the formula:

$$U_{jkt} = \frac{U_{jk(t-1)}}{(1 + I_{jk})} + N$$

Where:
 $U_{jkt}$ is usage of channel k in cell j for iteration t
 $I_{jk}$ is inhibition calculated for channel k in cell j
 N is a noise parameter, randomly selected from the range $+/-N_{max}$.

For low values of $I_{jk}$, (implying low interference) it is possible for $U_{jkt}$ to take a value greater than 1 if N is large. For example, if $U_{jkt-1}=0.99$, N is +1% of $U_{jkt-1}$, and $I_{jk}$ has a value of 0.01, $U_{jkt}=1.01$. Since actual usage cannot be greater than 1, and larger values could propagate in subsequent iterations, so any value greater than 1 is set at 1.

Finally iteration t increments to t+1, (step 203) and the next iteration begins. This simulates synchronous update of all cells.

The strength of inhibition on different channels determines how the partial usages change from their initial values (determined in step 104) relative to each other. The important difference between partial usage and 'actual' usage is that all the channels are partially used in all cells while the iterative process runs. 'Actual' usage of a channel only occurs when a solution is extracted (phase 300 below).

At any time a simple filter program can be used to produce a valid real solution from the current usage values (phase 300). Channels are allocated to a cell in descending order of their simulated "partial" usage in that cell (step 301), until demand is met (step 302). Satisfying demand for channels is thus treated as a hard constraint. The solution is made up of use or non-use of each channel, in other words it can only produce values of usage of zero or unity, but the iterative process (phase 200) can produce any value between zero and unity. The solution generated (step 302) can then be fed back to control the network 99.

For example, consider one cell J trying to meet a demand D for four channels, with ten channels k=0 to 9 available to be allocated. Initially (iteration t=0) all ten channels k=0 to 9 are partially used with a usage value of $U_{J00}=U_{J10}= \ldots =U_{J90}=0.4(+/-N)$. As the iterations go on, some channels are partially used more than others e.g after the ninth iteration t=9, for channel 0 the partial use value $U_{J09}=0.9$; for channel 1 $U_{J19}=0.2$; for channel 2 $U_{J29}=0.3$ etc, under the influence of inhibition from surrounding cells and adjacent channels within this cell. At any iteration t, the sum of values $U_{Jkt}$ over all channels k is the total demand in this cell, in this example equal to 4.

At any time a solution can be extracted (phase 300), by identifying the four channels with the highest usage values. The selected channels will then have 'actual' usage=1, and the other six channels will have 'actual' usage=0.

If inhibition is high in some cells, the formula used above can converge on a non-ideal solution as very low usage values can be generated in those cells in which high inhibition values are experienced. This problem can be reduced by making only a part of the usage value for each channel and cell available for change in each iteration. The formula then becomes:

$$U_{jkt} = (1-P)U_{jkt-1} + P\frac{U_{jk(t-1)}}{\left(1+\frac{I_{jk}}{C}\right)} + N$$

where P is the proportion of the usage value available to be changed on a given iteration, and C is a normalisation constant, required to ensure the total usage is equal to the demand D. By reserving part of the usage value, $(1-P)U_{jkt-1}$, against change, the usgae value is prevented from changing in a single iteration be greater than the factor P. For example if a cell is using a channel with usage 0.5 at time t, then at time t=t+1 it cannot be given a usage value less than 0.45, even if it experienced infinite inhibition from its neighbours. It will be seen that if P=C=1, this formula reduces to the one given earlier.

The method of the invention is well suited to online dynamic channel allocation. If demand changes in one or more cells, the process may be re-initialised (phase 100) and re-started. Alternatively, the usage values U generated in the most recent iteration may be adjusted by a factor $D_2/D_1$ determined by the change in demand, and used as the basis for the next iteration (step 204 in FIG. 1). For example, if demand halves in a cell, all the usage factors for that cell are halved so that they total to the new demand value. This has the advantage that the ranking of channels will remain similar at the next iteration, which will ensure continuity of coverage for any calls in progress. Changing demand for channels can therefore be readily accommodated and the channel allocation plan already in use can thus be altered to minimise the increase in interference resulting from use of the new channels.

At periods of extreme demand a given channel may be identified as having a partial usage value high enough to form part of the extracted solution in two adjacent cells. In this case, both cells are nevertheless allocated that channel if the demand in both cells requires its use. Of course co-channel interference will result in such a case, but in general the process adjusts partial usages so that this is unlikely to occur in practice.

The solution extractor pays no account of what neighbouring cells, or adjacent channels, are doing. It simply ranks the partial usages of channels in descending order and then reads down the list, allocating every channel, until demand is met. This simulates allocation of channels to all cells in parallel. For example, as shown in the table below (for fifteen channels), cell B has a demand of 10 whereas cell A only has a demand of 3. Channel 1 has the tenth highest usage in cell B (0.4) and the highest usage in both cell A (0.9). The solution extractor will nevertheless allocate channel 1 to cells (allocations indicated by "+").

|  | Cell A | Cell B |
|---|---|---|
| Total Demand | 3.0 | 10.0 |
| Channel | Usage | Usage |
| 1 | 0.9+ | 0.40+ |
| 2 | 0.1 | 0.71+ |
| 3 | 0.1 | 0.92+ |
| 4 | 0.2 | 0.93+ |
| 5 | 0.1 | 0.94+ |
| 6 | 0.1 | 0.95+ |
| 7 | 0.1 | 0.96+ |
| 8 | 0.1 | 0.97+ |
| 9 | 0.1 | 0.98+ |
| 10 | 0.1 | 0.99+ |
| 11 | 0.1 | 0.35 |
| 12 | 0.5+ | 0.30 |
| 13 | 0.1 | 0.25 |
| 14 | 0.3+ | 0.20 |
| 15 | 0.1 | 0.15 |

Figure 2A:
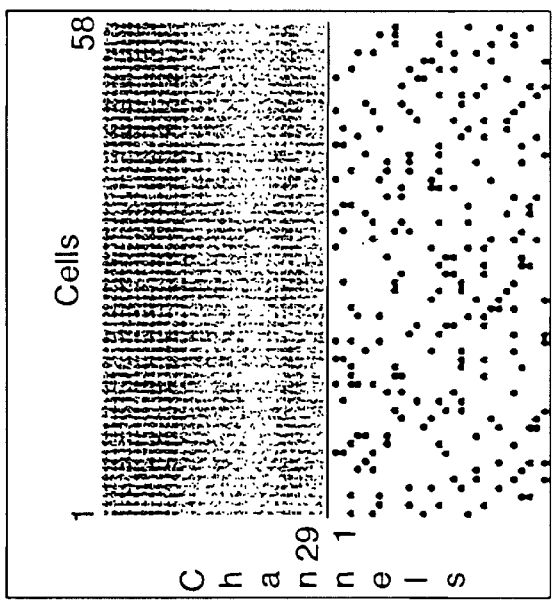
FIG. 2A is a map of a cellular radio network covering part of the United Kingdom.
Figure 2B:
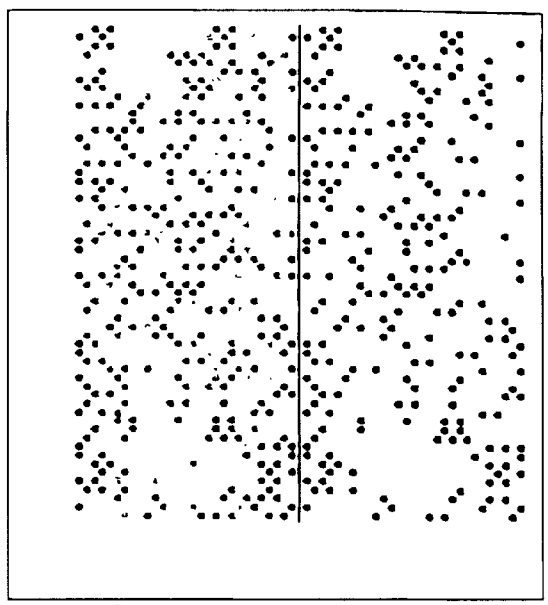
FIGS. 2B, 2C, and 2D illustrate the allocation of channels to the cells of the network of FIG. 2A, at successive stages of the process according to the invention.
Figure 2C:
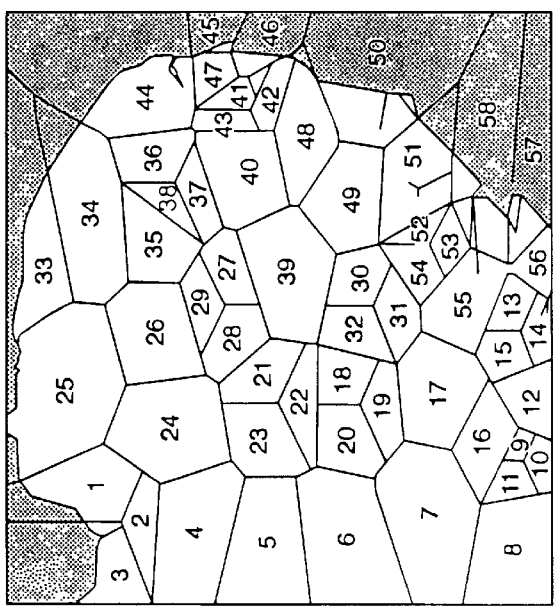
Figure 2D:
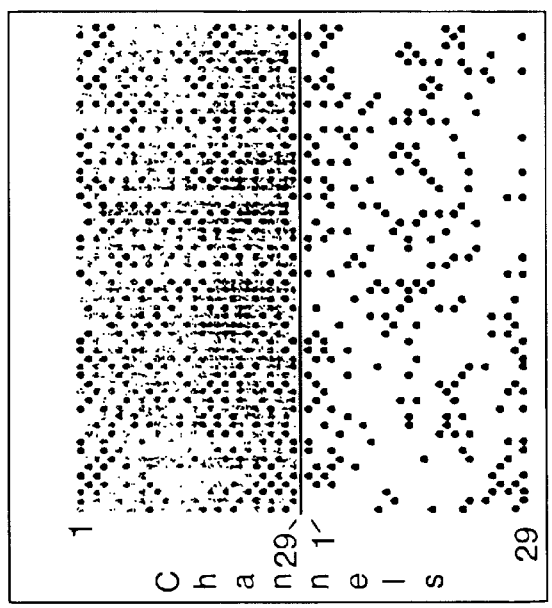

FIG. 2A is a map of a fifty-eight cell mobile phone network in East Anglia, UK (redrawn from Lochtie and Mehler 1995, cited above). FIGS. 2B, 2C, and 2D show channel usage and corresponding solutions at progressively later stages of optimisation. In each case the upper half of the Figure shows the simulated, partial usage of each of twenty-nine channels in each of the fifty-eight cells of the network (the darker the dot, the higher the usage). The lower half shows the solution which is extracted from this simulated usage. The solution is 'black and white'—a channel is either used (black) or not (white). Initially simulated usage is homogeneous and the solution is random (FIG. 2B). As time goes on the simulated usage becomes more heterogeneous (FIG. 2C) and the extracted solution can be seen to be drawn from the simulated usage with few ambiguities (FIG. 2D).

The example cellular telephone network to which the process is applied is taken from Lochtie and Mehler (1995). It is a network in the East Anglian region of the United Kingdom, with fifty-eight base stations (FIG. 2) and twenty-nine radio channels available to be allocated to those base stations.

Lochtie and Mehler report a subspace approach technique which allows a fixed, uniform demand for four channels in each cell to be successfully met without breaching their interference criteria. The same interference criteria are used for the simulations reported below. These criteria are certainly an over-simplification. More subtle interference criteria could be incorporated into the simulation without increasing the computation time, if the data were available.

Lochtie and Mehler (1995) successfully produce a channel allocation plan with uniform demand for four channels. This plan gives zero interference according to their interference criteria, which are adopted herein. It is therefore of interest to see whether the process described here could also produce a zero interference plan if each cell demands 4 channels.

Figure 3:
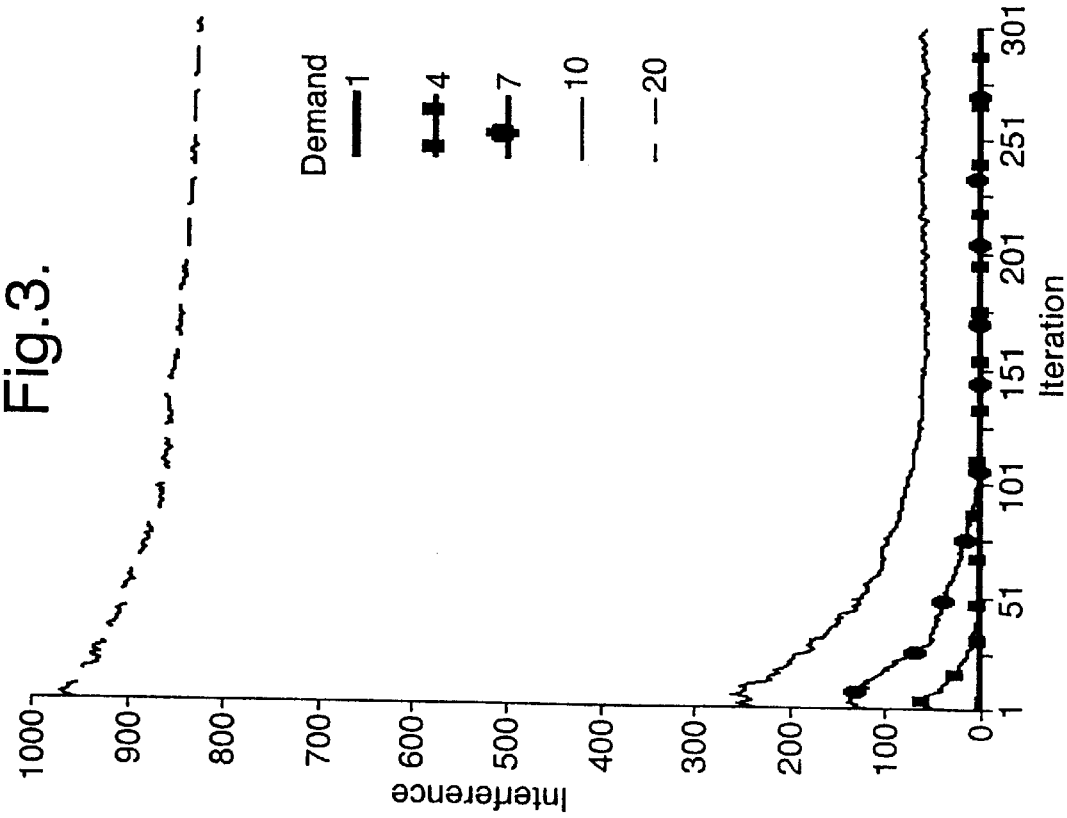

FIG. 3 shows the total interference in the network for simulations with various uniform levels of demand. Total network interference for the solution extracted at each iteration is shown. The key shows the number of channels used by each cell in the five simulations. In effect a solution has been extracted from the process after every iteration and the interference corresponding to that solution is plotted.

In the case where uniform demand takes the value of 4 the process rapidly finds a zero interference solution. Indeed the process reproducibly finds zero-interference solutions even when every cell demands seven channels. At demands of greater than seven channels, no zero-interference solutions are found. However, the process still produces a marked downward trend in the interference as iterations progress.

Figure 4:
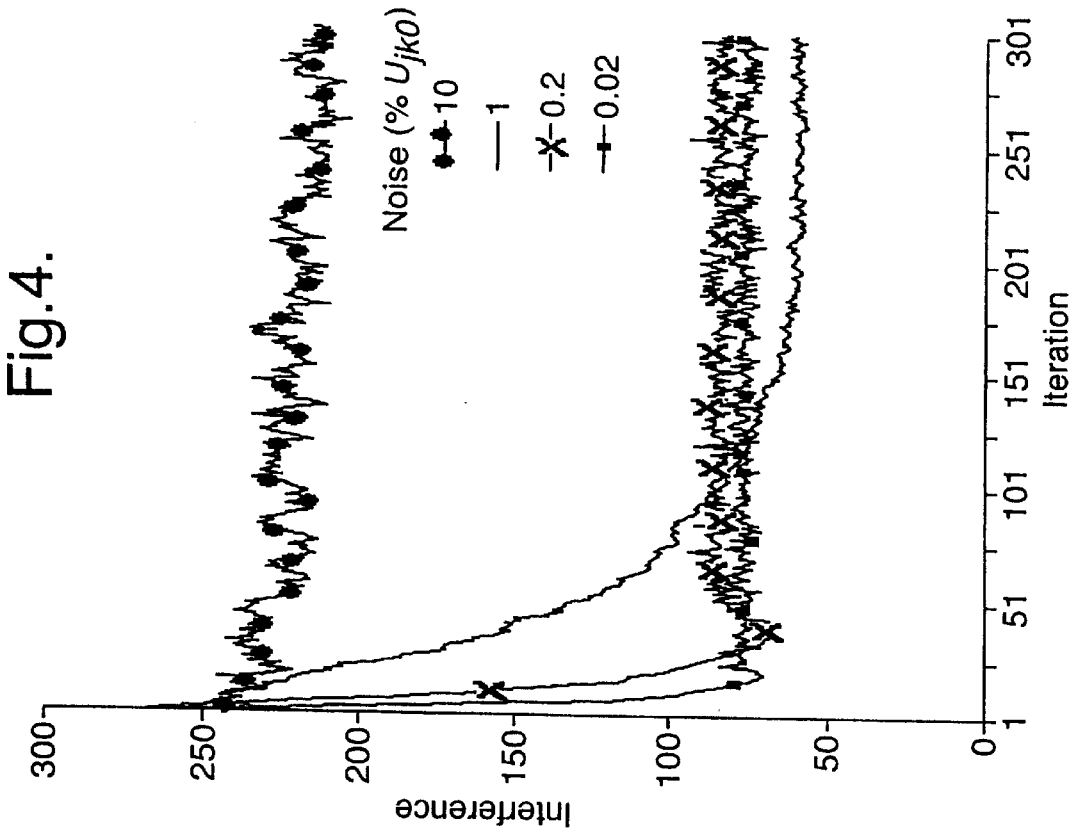
FIGS. 3, 4, 5 and 6 illustrate the behaviour of the network of FIG. 2A when controlled by the process of the invention, in a typical situation.

FIG. 4 illustrates the effect of the noise factor, using optimisation to a uniform demand value of 10 in every cell, with different maximum values chosen for the noise parameter. Once again the total network interference for the solution extracted at each iteration is shown. The key shows noise values as percentage of initial usage $U_{jko}$.

The influence of the value of the noise parameter on the behaviour of the process was tested by varying that parameter for successive optimisation runs. In each case the demand for channels was 10 in all cells to ensure that no zero-interference solution exists, thereby making this a meaningful test of optimisation behaviour.

The results (FIG. 4) illustrate the dangers of low values for the noise parameter. When $N_{max}$ is set to 0.02% the process reaches an asymptote within forty iterations, but this asymptote is not the global minimum. With a $N_{max}$ value of 1% the process approaches an asymptote more slowly, (150 iterations) but that asymptote has a lower interference solution. A $N_{max}$ value of 10% is sufficient to almost completely destroy the downward trend achieved by the mutually inhibitory mechanism. It results instead in a random search (and illustrates, in the process, the futility of such a search method).

The results so far have been presented as total interference in the network. This is a good measure of the performance of the process because it shows to what degree the short range inhibition acting between cells, without any knowledge of the total interference for the whole network, is able to drive down the overall interference value. The success of the process in finding low interference plans arises from the purely selfish, shortsighted response of each cell to inhibition.

Figure 5:
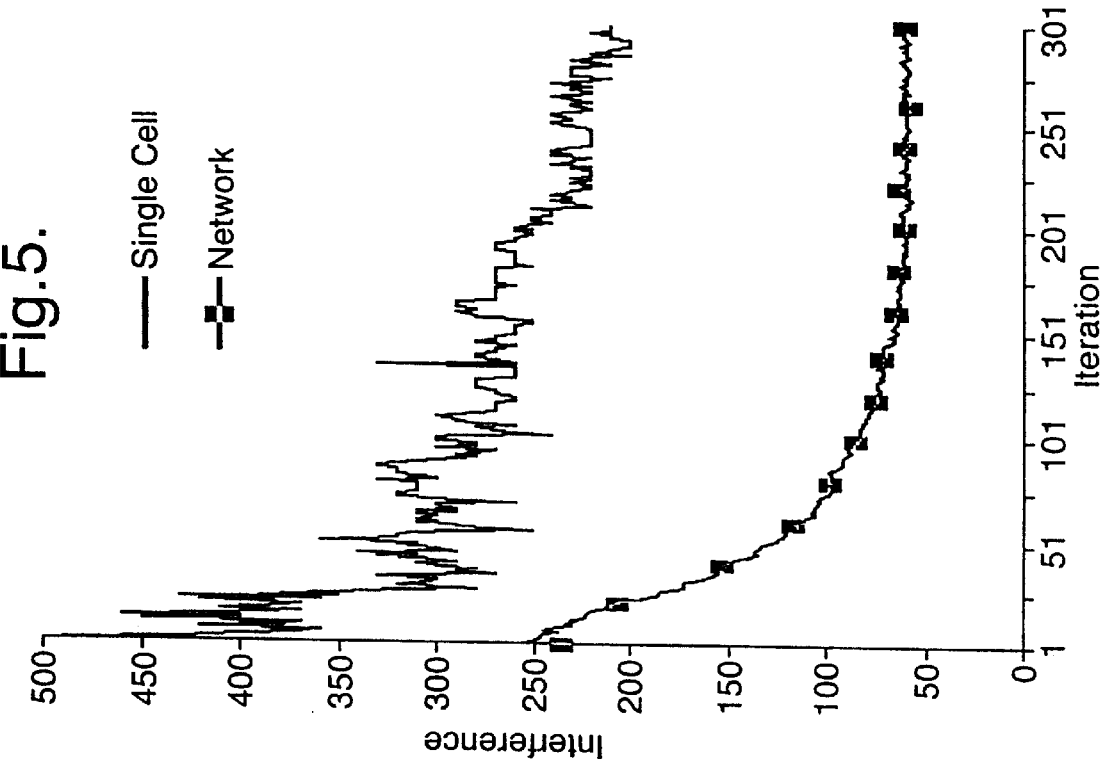

However it is also important to measure the behaviour of the process at the level of individual cells. It is possible that a channel planning process could achieve an overall low interference in the network by producing a plan with zero interference in most cells but high interference in one cell. FIG. 5 compares the trend in total network interference with the trend in the highest interference value found in any single cell. A plot of the highest interference in any single cell is shown with the single cell value multiplied by 58 for comparison with total interference. The interference experienced by individual cells falls off in much the same way as the overall interference in the network. The interference is apparently spread across many cells in the network rather than being concentrated in a few.

Figure 6:
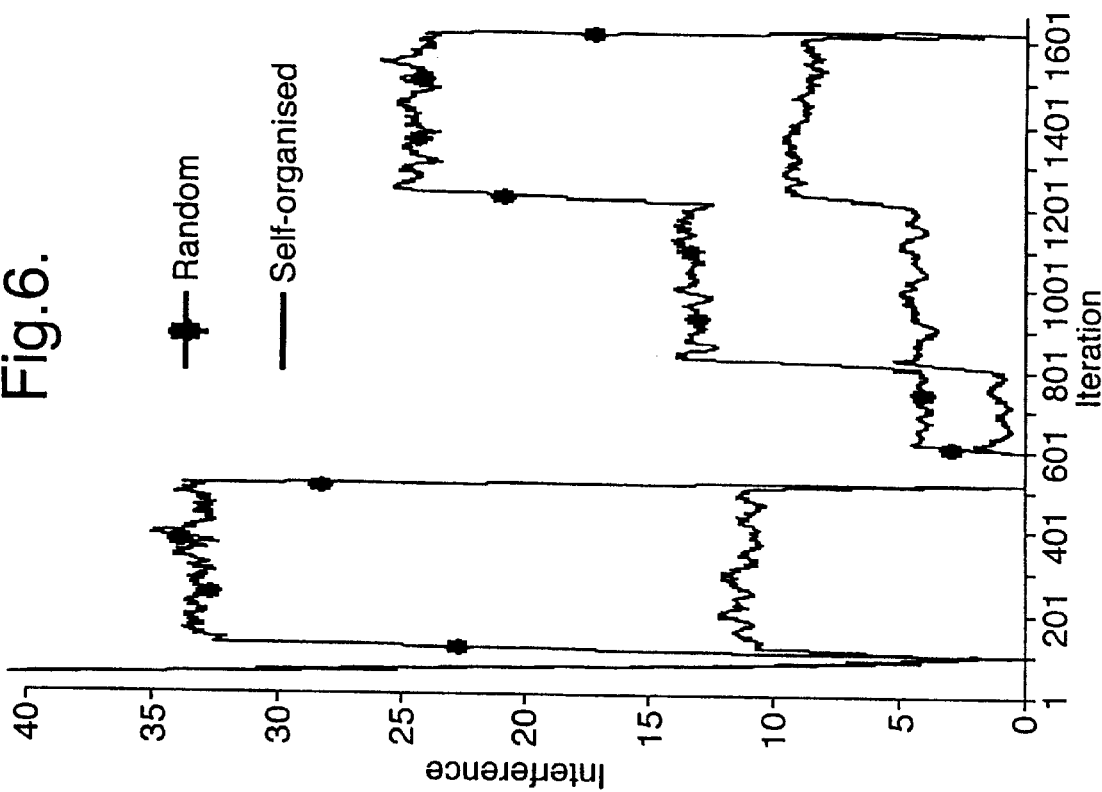

Testing the process under conditions of uniform demand is useful in allowing comparison with earlier work and evaluation of basic behaviour of the process. It does not, however, address the issue of dynamic, responsive channel allocation. A simulation of dynamic demand was created to see how well the process deals with non-uniform, changing patterns of demand, as shown in FIG. 6. In FIG. 6 demand initially has a value of 6 in every cell in the network and interference is successfully eliminated. At iteration 100 'rush hour' is simulated. At iteration 600 a road accident is simulated and traffic queues form in surrounding cells at iterations 800 and 1200.

The simulation begins with uniform demand of 6 and a zero interference solution is found. Rush hour then begins in three of the large towns covered by the network: Ipswich (cells 52, 53 and 54 in FIG. 2), Great Yarmouth (cells 41, 42, 43, 45, 46), and Norwich (cells 35, 36, 37 and 38). Demand in these cells rises abruptly to 10. When rush hour ends, demand returns to 6. An accident then occurs on the road to Norwich, cell 39. Demand in this cell rises to 10, traffic queues begin to form, later spreading into cells 27, 30 and 31, resulting in demand rising to 10 in those cells. Eventually congestion spreads as far as cells 37, 38, 32 and 34. Finally the accident is cleared and demand in all cells returns to a value of 6.

Total interference across the network during this scenario is shown in FIG. 6. Each surge in demand results in an increase in interference as new channels are grabbed by the cells in question. Clearly the total interference in the network is far less than if ten channels were assigned to each cell (see FIG. 4). However, comparison with the steady-state allocation plan is not a good measure of the process's performance because other processes could be envisaged which would also outperform the simple policy of uniform allocation of 10 channels. For example, a process which, having established a zero-interference uniform six-channel plan, randomly assigns new channels to meet rising demand is plotted on FIG. 6 for comparison. The self-organising process of the invention produces significantly better allocation plans than this 'random' process.

What is claimed is:

1. A channel allocation process for a cellular telephone network said process comprising:

starting from a position of homogeneity in which each base station has the potential to use all channels, developing ever greater heterogeneities by processing in a model of the network a combination of short and medium range possible interactions between the base stations, causing each modeled base station of the cellular telephone network to inhibit its modeled neighbors from using a given channel, and generating a usage factor $U_{jkt}$ for each channel in each modeled cell indicative of the level of interference to be expected on that channel in that modeled cell.

2. A process as in claim 1, wherein channels are allocated to each real base station of the actual network according to the ranking of the usage factors determined for the channels at the model for that base station.

3. A process as in claim 1, wherein the network is emulated by a data processor.

4. A process as in claim 3, wherein outputs from the data processor also control the base stations of the network.

5. A process as in claim 1 in which each base station of the network performs that part of the process relating to itself, in co-operation with its neighbors, and utilizes channels in accordance with the results.

6. A cellular telephone network comprising:

channel allocation means for allocating radio channels to base stations, the allocation means having means for generating an initial homogeneous allocation model in which each base station has the potential to use all channels, and means to develop ever greater heterogeneities in the allocation plan model by processing a combination of short and medium range interactions between the base stations, causing each base station of the modeled cellular telephone network to inhibit its neighbors from using a given channel, to generate a usage factor $U_{jkt}$ for each channel in each cell indicative of the level of interference to be expected on that channel in that cell.

7. A cellular telephone network as in claim 6, comprising means for allocating channels to base stations by selecting those channels in the model having the optimum usage factors.

8. A cellular telephone network as in claim 6 in which:
   each base station has means for generating its own channel allocation plan, in co-operation with neighboring base stations,
   each base station having means to receive inhibition factors generated by neighboring base stations, means to generate an expected usage factor for each channel based on the inhibition factors received from the other base stations, and means to generate inhibition factors for transmission to neighboring base stations.

9. A computer program product directly loadable into the internal memory of a digital computer, said program product comprising software code portions for performing the process of claim 1 when said product is run on a computer.

10. A computer-usable carrier computer-readable program means, the program means comprising:
   computer-readable program means for causing a computer to determine a position of homogeneity in which each base station of a modeled network of cellular base stations has the potential to use all channels,
   computer-readable program means for causing a computer to develop ever greater heterogeneities in the modeled network by processing a combination of short and medium range interactions between the base stations,
   computer-readable program means for causing a computer to control each real base station of the actual cellular telephone network being modeled to inhibit its neighbors from using a given channel, and
   computer-readable program means for causing a computer to generate a usage factor $U_{jkt}$ for each channel in each cell of the model indicative of the level of interference to be expected on that channel in that modeled cell.

* * * * *